(12) United States Patent
Franzen

(10) Patent No.: US 10,866,600 B2
(45) Date of Patent: *Dec. 15, 2020

(54) PRESSURE-REGULATING VALVES

(71) Applicant: Hamilton Sundstrand Corporation, Charlotte, NC (US)

(72) Inventor: Mark F. Franzen, Brodhead, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/981,416

(22) Filed: May 16, 2018

(65) Prior Publication Data

US 2018/0259981 A1 Sep. 13, 2018

Related U.S. Application Data

(63) Continuation of application No. 14/282,781, filed on May 20, 2014, now Pat. No. 10,007,276.

(51) Int. Cl.
*G05D 16/10* (2006.01)
*H02K 9/19* (2006.01)
*G05D 16/00* (2006.01)

(52) U.S. Cl.
CPC ......... *G05D 16/103* (2013.01); *G05D 16/024* (2019.01); *G05D 16/10* (2013.01); *H02K 9/19* (2013.01); *Y10T 137/86767* (2015.04)

(58) Field of Classification Search
CPC ......... Y10T 137/2622; Y10T 137/2625; Y10T 137/2627; Y10T 137/263; Y10T 137/2642;
(Continued)

(56) References Cited

U.S. PATENT DOCUMENTS 2,655,169 A   10/1953   Towler et al.
2,890,715 A   6/1959   Ebersold
(Continued)

FOREIGN PATENT DOCUMENTS

EP   0009749 A1   4/1980
WO   WO-2006/060619 A2   6/2006

OTHER PUBLICATIONS

Extended European Search Report dated Oct. 13, 2015, issued on corresponding European Patent Application No. EP 15164389.7.
(Continued)

*Primary Examiner* — William M McCalister
(74) *Attorney, Agent, or Firm* — Locke Lord LLP; Scott D. Wofsy; Georgi Korobanov

(57) ABSTRACT

A pressure-regulating valve includes a valve sleeve with first and second ends defining a longitudinal axis, a sense line, a sense piston, a main chamber, and first and second valve spools. The sleeve includes an axially aligned bore. The sense line is within the bore proximate the first end. The sense piston is within the bore between the sense line and the second end, and is configured to move along the longitudinal axis in response to pressure exerted by fluid in the sense line. The main chamber is within the bore between the sense piston and the second end, and includes supply and vent ports. The first valve spool is within the bore between the sense piston and the second end. The second valve spool is within the bore between the first valve spool and the second end.

11 Claims, 3 Drawing Sheets

(58) Field of Classification Search
CPC ....... Y10T 137/2647; Y10T 137/86726; Y10T 137/86734; Y10T 137/86767; Y10T 137/86775; G05D 16/024; G05D 16/10; G05D 16/103; H02K 9/19

See application file for complete search history.

(56) References Cited

U.S. PATENT DOCUMENTS

| | | | |
|---|---|---|---|
| 3,146,720 A | 9/1964 | Henry | |
| 3,532,122 A | 10/1970 | Bienzeisler | |
| 3,777,773 A | 12/1973 | Tolbert | |
| 4,003,400 A | 1/1977 | Turner | |
| 4,279,268 A | 7/1981 | Aubert | |
| 4,303,091 A | 12/1981 | Hertell et al. | |
| 4,368,872 A | 1/1983 | Machat | |
| 4,664,137 A | 5/1987 | Leorat et al. | |
| 4,679,988 A | 7/1987 | Leorat et al. | |
| 5,013,220 A | 5/1991 | Nakagawa et al. | |
| 6,062,681 A | 5/2000 | Field et al. | |
| 7,251,925 B2 | 8/2007 | Paradise | |
| 7,284,471 B2 * | 10/2007 | Jacobsen | F15B 13/04 91/457 |
| 8,256,445 B2 | 9/2012 | Arnett | |
| 8,485,218 B2 | 7/2013 | Lemmers, Jr. et al. | |
| 9,581,250 B2 | 2/2017 | Wales | |
| 10,007,276 B2 * | 6/2018 | Franzen | G05D 16/103 |
| 2010/0283333 A1 | 11/2010 | Lemmers, Jr. et al. | |

OTHER PUBLICATIONS

Extended European Search Report dated Dec. 6, 2019, issued during the prosecution of corresponding European Patent Application No. EP 19178218.4.

* cited by examiner

PRESSURE-REGULATING VALVES

CROSS-REFERENCE TO RELATED APPLICATIONS

This application is a continuation of U.S. patent application Ser. No. 14/282,781 filed on May 20, 2014, the disclosure of which is herein incorporated by reference in its entirety.

BACKGROUND OF THE INVENTION

1. Field of the Invention

The present invention relates to valves, and, in particular, to pressure-regulating valves.

2. Description of Related Art

Traditional pressure-regulating valves can be used, for example, in hydraulic cooling circuits of an electrical generator. Generators typically include a rotor which is driven to rotate by a source of rotation, such as a gas turbine engine on an aircraft. The rotor carries electric windings, which rotate in proximity to stator windings. The rotation of the rotor adjacent to the stator generates electricity. Cooling fluid is required to be delivered to several locations within the generator to ensure continued efficient operation of the systems and components.

Traditional regulating valves can sometimes experience instability potentially resulting in cooling circuit failures. Instability can arise from insufficient damping due to trapped air in chambers of the valve, and/or to incompatibility between the pressure-regulating valve frequency response and the hydraulic circuit frequency response.

Such conventional methods and systems have generally been considered satisfactory for their intended purposes. However, there is still a need in the art for systems and methods that allow for improved regulating valves. The present invention provides a solution for these problems.

SUMMARY OF THE INVENTION

A pressure-regulating valve includes a valve sleeve, a sense line, a sense piston, a main chamber, and first and second valve spools. The valve sleeve includes first and second ends defining a longitudinal axis therebetween and a bore axially aligned between the first and second ends. The sense line is defined within the bore proximate the first end of the valve sleeve. The sense piston is mounted within the bore between the sense line and the second end of the valve sleeve. The sense piston is configured to move along the longitudinal axis in response to pressure exerted by fluid in the sense line. The main chamber is defined within the bore between the sense piston and the second end and includes supply and vent ports. The supply port and the vent port are in fluid communication with one another by way of the main chamber. The first valve spool is mounted within the bore between the sense piston and the second end of the valve sleeve and occludes a portion of the vent port to a variable extent to modulate a flow rate between the supply port and the vent port. The first valve spool is configured to move along the longitudinal axis to modulate a flow rate in a fluid circuit for regulation of a sense pressure. The second valve spool is mounted within the bore between the first valve spool and the second end of the valve sleeve and is configured to move along the longitudinal axis to modulate flow rate in a bypass line for regulation of a balance pressure.

The valve sleeve can include first and second housing portions proximate the first and second ends, respectively. The sense piston and first valve spool can be mounted in the first housing portion and the second valve spool can be mounted in the second housing portion. The second housing portion can be secured to the first housing portion with a mechanical fastener.

The pressure-regulating valve can include a first spring mounted between the first valve spool and the second housing portion. The first spring can be operatively connected to the first valve spool for biasing the first valve spool towards the first end of the valve sleeve. A second spring can be mounted within the bore between the second valve spool and the second end of the valve sleeve. The second spring can be operatively connected to the second valve spool for biasing the second valve spool towards the first end of the valve sleeve.

The pressure-regulating valve can include a bypass line defined between the sense line and a balance pressure chamber for fluid communication therebetween. The balance pressure chamber can be defined between the first and second valve spools and can include an inlet and an outlet. The second valve spool can occlude a portion of the outlet of the balance pressure chamber to a variable extent to regulate pressure within the balance pressure chamber. The balance pressure chamber can form a portion of a balance pressure circuit and can be configured for continuous fluid flow between the inlet of the balance pressure chamber and the outlet of the balance pressure chamber for purging trapped air from the balance pressure circuit.

The main chamber can be defined between first and second land portions of the first valve spool. The bypass line can be defined through the sense piston and/or the first valve spool. The pressure-regulating valve can include a bypass orifice within a portion of the bypass line in the sense piston proximate to the sense line, and/or within a portion of the bypass line in the second land portion proximate the balance pressure chamber. The bypass orifice can be configured to sustain a pressure differential between the sense line and the balance pressure chamber and to meter flow through the bypass line. The pressure-regulating valve can include a transfer tube between the sense piston and the first land portion of the first valve spool for connecting a first portion of the bypass line in the sense piston with a second portion of the bypass line in the first valve spool. The bypass line can be defined between the main chamber and the balance pressure chamber for fluid communication therebetween.

A generator includes a housing, a rotor disposed in the housing, a fluid circuit including an inlet and outlet port, and a pressure-regulating valve. The rotor is configured to rotate and generate electricity. The pressure-regulating valve is operatively connected to the fluid circuit to modulate the flow of fluid through the fluid circuit so as to regulate pressure in the sense line. The sense line is in fluid communication with the fluid circuit. The supply and vent ports of the main chamber are in fluid communication with an oil pump disposed in the housing of the generator. A frequency response of the pressure-regulating valve is configured to be tunable for compatibility with a frequency response of the fluid circuit.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
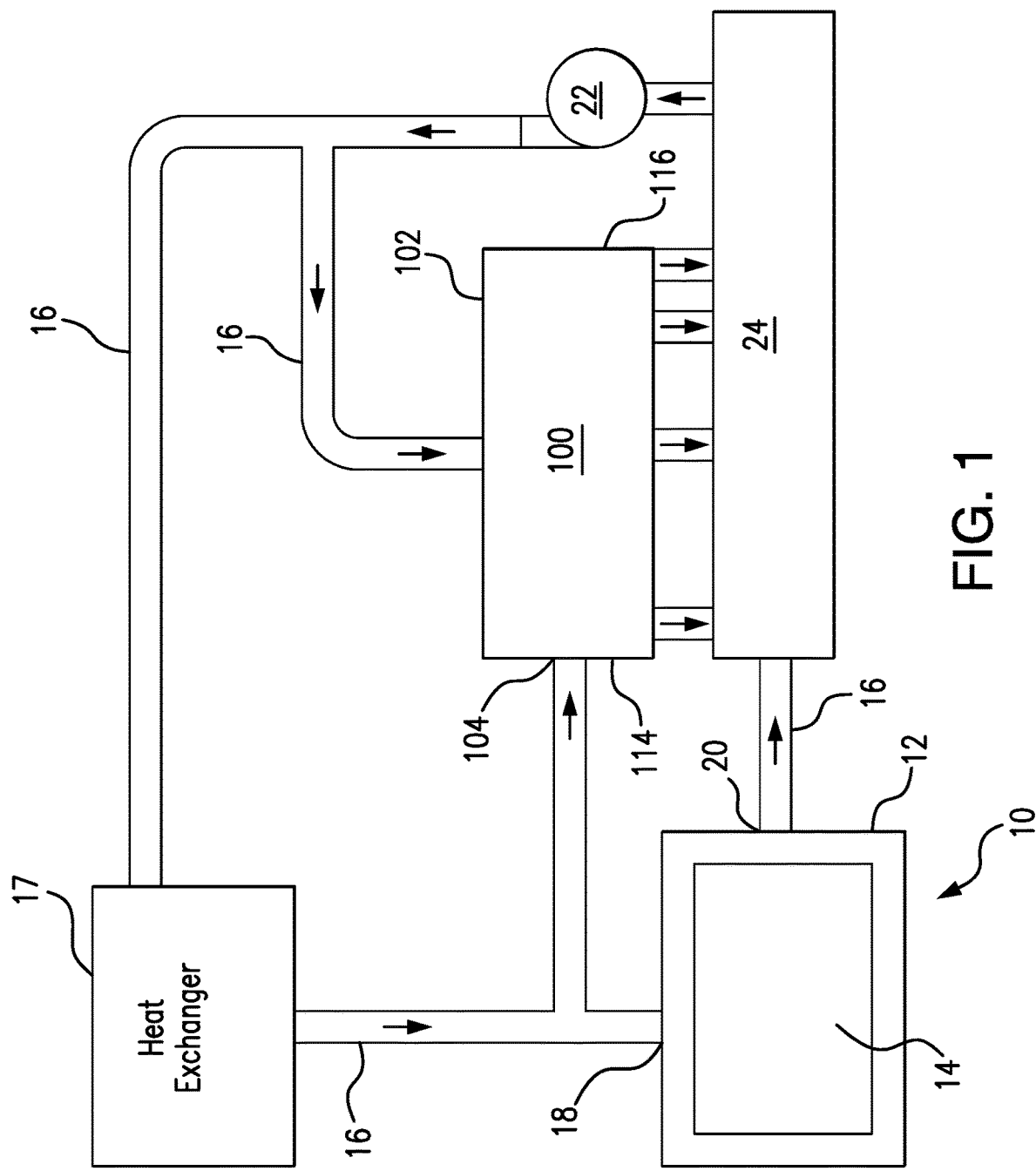
FIG. 1 is a schematic plan view of a portion of an exemplary embodiment of a generator constructed in accordance with the present disclosure.

Reference will now be made to the drawings wherein like reference numerals identify similar structural features or aspects of the subject disclosure. For purposes of explanation and illustration, and not limitation, a perspective view of an exemplary embodiment of a pressure-regulating valve in a generator in accordance with the disclosure is shown in FIG. 1 and is designated generally by reference character 100. Other embodiments of pressure-regulating valves in accordance with the disclosure, or aspects thereof, are provided in FIGS. 2-3, as will be described.

As shown in FIG. 1, a generator 10 includes a housing 12, a rotor 14 disposed in housing 12 including an inlet port 18 and an outlet port 20, a fluid circuit 16, a heat exchanger 17 in fluid communication with fluid circuit 16, and a pressure-regulating valve 100. Rotor 14 is configured to rotate and generate electricity. Pressure-regulating valve 100 is operatively connected to fluid circuit 16 to regulate the pressure of fluid, such as cooling and/or lubricating oil, at inlet port 18. Those skilled in the art will readily appreciate that pressure-regulating valve 100 can be disposed in a variety of suitable locations along fluid circuit 16. Arrows schematically show the fluid flow through fluid circuit 16.

Figure 2:
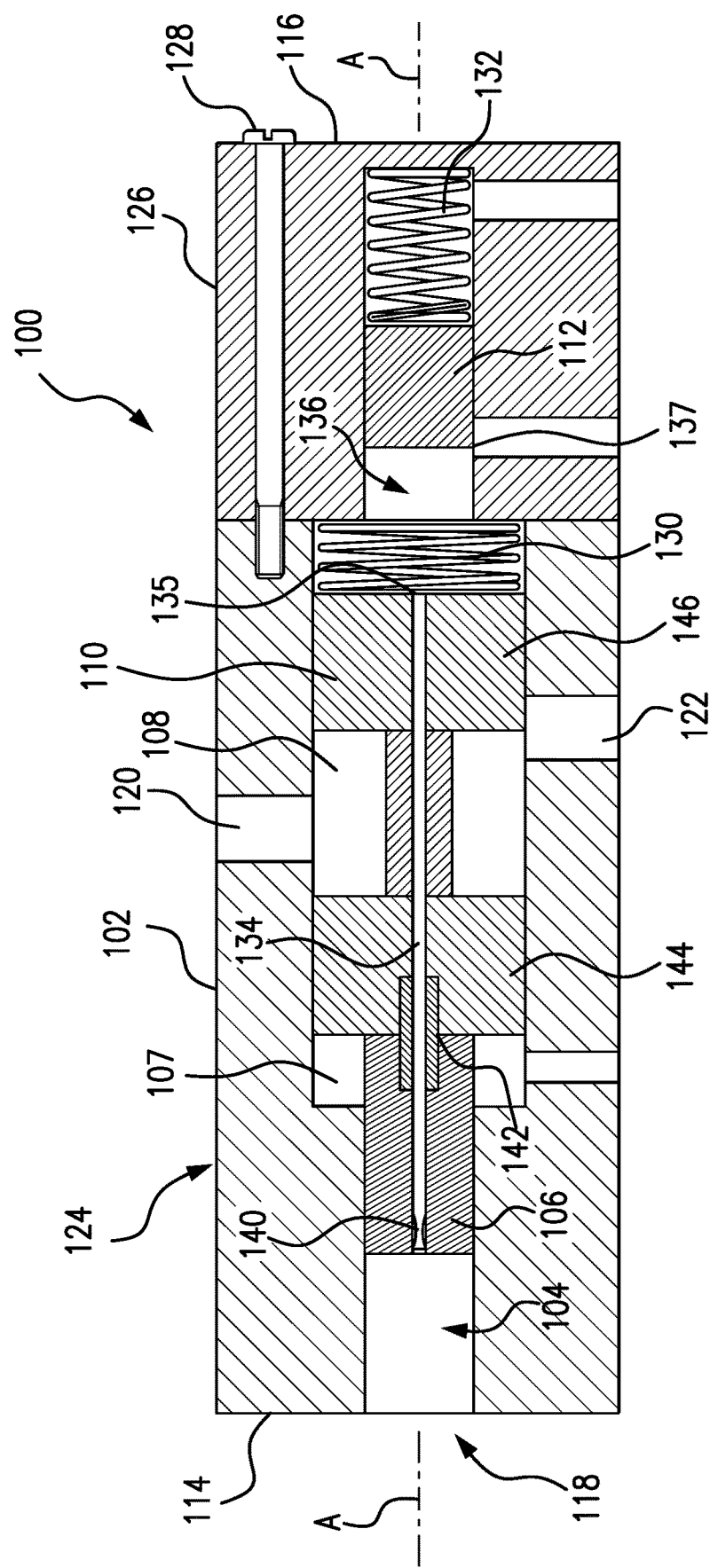
FIG. 2 is a cross-sectional side-elevation view of an exemplary embodiment of a pressure-regulating valve constructed in accordance with the present disclosure, showing the first valve spool and the first spring, and the second valve spool and the second spring.

With reference now to FIGS. 1 and 2, pressure-regulating valve 100 includes a valve sleeve 102 with first and second ends 114 and 116, respectively, and a sense line 104. First and second ends 114 and 116, respectively, define a longitudinal axis A therebetween. Pressure-regulating valve 100 includes a bore 118 axially aligned between first and second ends, 114 and 116, respectively. Sense line 104 is defined within bore 118 proximate first end 114 and is in fluid communication with fluid circuit 16. A main chamber 108 is defined within the bore of valve sleeve 102 and includes supply and vent ports, 120 and 122, respectively. Supply and vent ports, 120 and 122, respectively, are in fluid communication with one another by way of main chamber 108, and are in fluid communication with an oil pump 22. Vent port 122 outlets into a sump 24.

Now with reference to FIG. 2, pressure-regulating valve 100 includes a sense piston 106, a first valve spool 110 and a second valve spool 112. Sense piston 106 is mounted within bore 118 between sense line 104 and first valve spool 110. Sense piston 106 is configured to move along longitudinal axis A in response to pressure exerted by fluid in sense line 104. First valve spool 110 is mounted within bore 118 between sense piston 106 and a second housing portion 126 and occludes a portion of vent port 122 to a variable extent to modulate a flow rate between supply port 120 and vent port 122. The modulation of flow rate through main chamber 108, between supply port 120 and vent port 122, is the means for modulating flow rate through hydraulic cooling circuit, e.g. fluid circuit 16, for the purpose of regulating pressure at sense line 104.

First valve spool 110 is configured to move along longitudinal axis A to modulate a flow rate in fluid circuit 16 for regulation of a sense pressure. Second valve spool 112 is mounted within bore 118 between first valve spool 110 and second end 116 and is configured to move along longitudinal axis A to modulate flow rate in a bypass line 134 for regulation of a balance pressure. Those skilled in the art will readily appreciate that the regulated balance pressure counteracts a sense force exerted on first valve spool 110 by the sense pressure with a balance force. If the sense force and balance force are not in equilibrium, first valve spool 110 will translate, thus modulating flow rate from supply 120 to sump 24 until the sense force comes into equilibrium with the balance force. A frequency bandwidth of pressure-regulating valve 100 is tunable for avoiding frequency bandwidth incompatibility with fluid circuit 16, described above.

With continued reference to FIG. 2, valve sleeve 102 includes a first housing portion 124 proximate first end 114 and second housing portion 126 proximate second end 116. Sense piston 106 and first valve spool 110 are mounted in first housing portion 124, i.e. first stage regulator, and second valve spool 112 is mounted in second housing portion 126, i.e. second stage regulator. Alternatively, it is contemplated that sense piston 106 can be mounted in first housing portion 124, while first valve spool 110 and second valve spool 112 can be mounted in second housing portion 126. Second housing portion 126 is secured to first housing portion 124 with a mechanical fastener 128. Pressure-regulating valve 100 includes a first spring 130 mounted between first valve spool 110 and second housing portion 126. First spring 130 is operatively connected to first valve spool 110 for biasing first valve spool 110 towards first end 114 of valve sleeve 102. A second spring 132 is mounted within bore 118 between second valve spool 112 and second end 116. Second spring 132 is operatively connected to second valve spool 112 for biasing second valve spool 112 towards first end 114 of valve sleeve 102.

As shown in FIG. 2, the bypass line 134 is defined between sense line 104 and a balance pressure chamber 136, through the sense piston 106 and the first valve spool 110, for fluid communication between sense line 104 and balance pressure chamber 136. Balance pressure chamber 136 is defined between the first and second valve spools, 110 and 112, respectively, and includes an inlet 135 and an outlet 137. It is contemplated that second valve spool 112 can move between a fully open position and an occluded position, where the occluded position variably blocks at least a portion of outlet 137 of balance pressure chamber 136 to modulate a flow rate between inlet 135 and outlet 137 of balance pressure chamber. Inlet 135 is defined where the balance pressure chamber 136 meets an end of the bypass line 134. Balance pressure chamber 136 forms a portion of a balance pressure circuit. Balance pressure circuit starts at sense line 104 and includes bypass line 134, and balance pressure chamber 136. Balance pressure chamber 136 is configured for continuous fluid flow between inlet 135 and outlet 137 to enable both negative and positive modulation of flow rate between inlet 135 and outlet 137 and to purge trapped air from balance pressure chamber 136.

Those skilled in the art will readily appreciate that the reduction in trapped air tends to increase the stiffness of the fluid, therein increasing the dampening robustness of the fluid. Main chamber 108 is defined between first and second land portions, 144 and 146, respectively, of first valve spool 110. It is contemplated that first valve spool 110 can move between a fully open position and an occluded position, where the occluded position variably blocks at least a portion of vent port 122 to modulate a flow rate between supply port 120 and vent port 122.

Pressure-regulating valve 100 includes a bypass orifice 140 within a portion of the bypass line 134 in the sense piston 106 proximate to the sense line 104. Bypass orifice 140 is configured to sustain a pressure differential between the sense line and balance pressure chamber and to meter flow through the bypass line. Pressure-regulating valve 100 includes a transfer tube 142 between sense piston 106 and a first land portion 144 of the first valve spool 110 for connecting a first portion of bypass line 134 in the sense piston 106 with a second portion of bypass line 134 in the first valve spool 110. Transfer tube 142 mitigates leakage to a chamber 107 surrounding sense piston 106.

Figure 3:
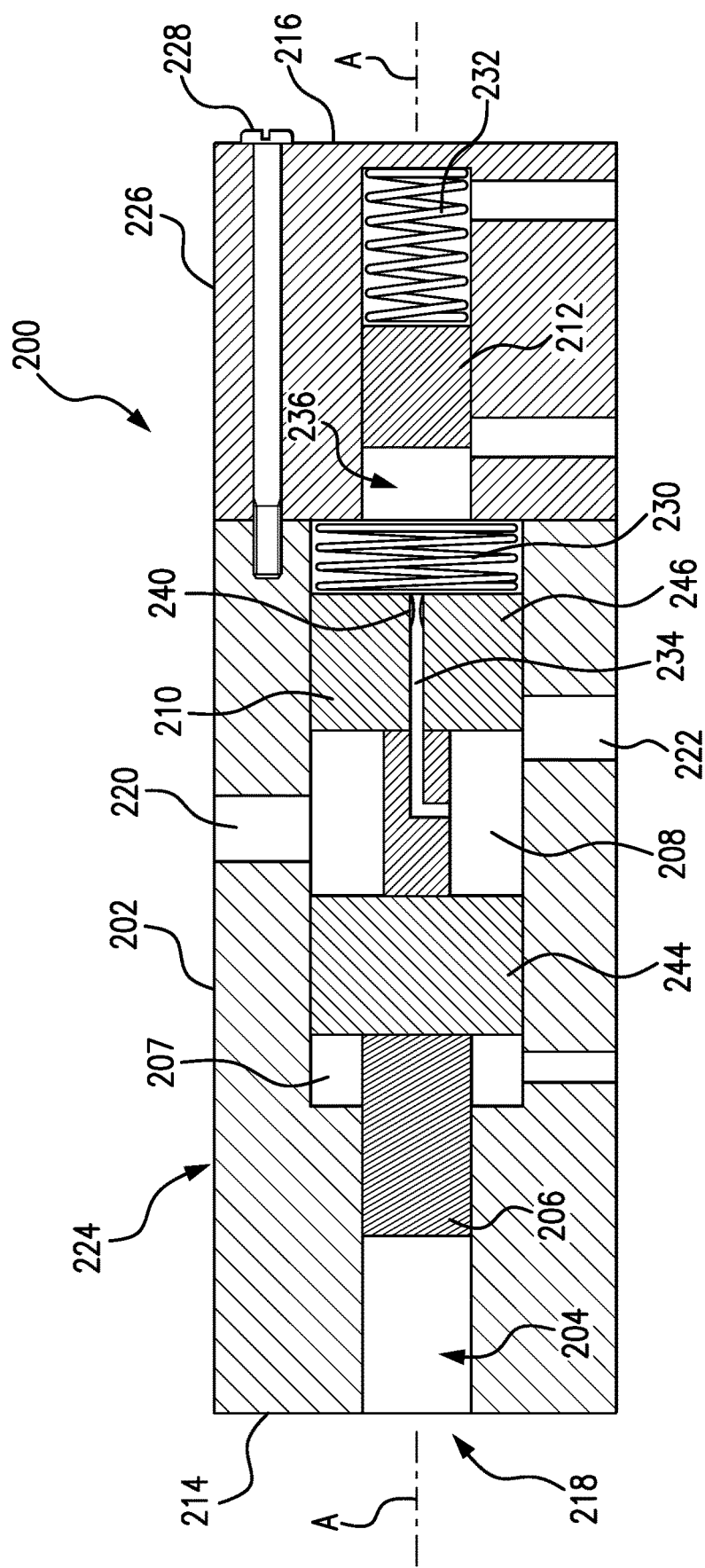
FIG. 3 is a cross-sectional side-elevation view of another exemplary embodiment of a pressure-regulating valve constructed in accordance with the present disclosure, showing the bypass line defined between the main chamber and the balance pressure chamber.

Now with reference to FIG. 3, a pressure-regulating valve 200 includes first and second ends, 214 and 216, respectively, and a bore 218, similar to ends and bore described above with respect to pressure-regulating valve 100. Pressure-regulating valve 200 includes a valve sleeve 202, a sense line 204, a sense piston 206, a main chamber 208, a first valve spool 210, a second valve spool 212, a balance pressure chamber 236, a first spring 230 and a second spring 232, all of which are similar to those described above with respect to pressure-regulating valve 100.

With continued reference to FIG. 3, in pressure-regulating valve 200, a bypass line 234 is defined between main chamber 208 and balance pressure chamber 236 for fluid communication therebetween. A bypass orifice 240, similar to bypass orifice 140 described above, is defined within a portion of bypass line 234 in second land portion 246 proximate balance pressure chamber 236. Those skilled in the art will readily appreciate that a transfer tube, e.g. transfer tube 142, is not required in pressure-regulating valve 200 because bypass line 234 is only defined through first valve spool 210.

Now with reference to FIGS. 2 and 3, the overall control gain frequency response function, $G_c(s)$, for pressure-regulating valves 100 and 200, respectively, is in the form of a frequency-band-limited proportional-action controller with lag compensator and is governed by the following equation:

$$G_c(s) = \frac{K(\tau_{lead}s + 1)}{(\tau_{lag}s + 1)\left(\frac{s^2}{\omega_n^2} + \frac{2\zeta}{\omega_n}s + 1\right)}$$

wherein K is the proportional gain, $\omega_n$ is the natural frequency, and $\zeta$ is the damping ratio of the band-limited proportional-action controller. The time constants, $\tau_{lead}$ and $\tau_{lag}$, are the time constants associated with the lag compensator. The variable s represents the Laplace variable.

Pressure regulating valves 100 and 200 produce control action in proportion to the difference between the sense force and the balance force, described above. The overall control gain is highest with value, K, at low frequencies having periods longer than the compensator lag time constant, $\tau_{lag}$. The overall control gain, $G_c(s)$, progressively attenuates over increasing frequencies having periods between the lead and lag time constants, $\tau_{lead}$ and $\tau_{lag}$, respectively. At frequencies beyond $\tau_{lead}$, the overall control gain is level up to the band-limiting natural frequency, $\omega_n$. At frequencies beyond $\omega_n$, the overall control gain diminishes steeply. The result is a frequency-band-limited proportional-action controller with a lag compensator.

Those skilled in the art will readily appreciate that the frequency band limit tends to permit pressure regulating valves 100 and 200 to be configured to have diminished action at natural frequencies associated with the hydraulic cooling circuit, resulting in improved system stability. It is also contemplated that the lag compensator tends to permit pressure regulating valves 100 and 200 to be configured to have large impact at very low frequencies thus resulting in very small steady state error between the sense force and the balance force. The balance forces of each balance chamber 136 and 236 plus forces of their respective first springs 130 and 230 establish the target value for a regulated pressure in a balance chamber.

With continued reference to FIGS. 2 and 3, pressure-regulating valves 100 and 200 do not need to include their first springs 130 and 230, respectively. Those skilled in the art will readily appreciate that a first spring, e.g. first spring 130 or 230, is optional. In the absence of the first spring, a first valve spool, e.g. first valve spool 110 or 210, moves continuously until the sense pressure force is in equilibrium with the reaction force, e.g. balance force, induced by the regulated pressure in a balance chamber, e.g. balance pressure chamber 136 or 236, of the second stage regulator. The overall frequency response function, $G_c(s)$, for each of pressure-regulating valves 100 and 200, without their respective first springs 130 and 230, is governed by the following equation:

$$G_c(s) = \frac{K(\tau_{lead}s + 1)}{s\left(\frac{s^2}{\omega_n^2} + \frac{2\zeta}{\omega_n}s + 1\right)}$$

wherein K is the proportional gain, $\omega_n$ is the band-limit natural frequency, and $\zeta$ is the damping ratio of the band-limited proportional-action controller. The overall frequency response function, $G_c(s)$, now includes pure integral action, $$\frac{\tau_{lead}s + 1}{s},$$

up to frequency $$\omega = \frac{1}{\tau_{lead}},$$

which has the effect of producing zero steady state error between the sense force and the balance force. The variable s represents the Laplace variable.

Those skilled in the art will readily appreciate that the design of the pressure-regulating valves, e.g. pressure regulating valves 100 and 200, largely uncouples steady state and dynamic performance of the pressure regulation system. The selection of the diameter of sense piston 106 or 206, and the diameter of first valve spool 110 or 210 in combination with the selection of a set-point of the second stage pressure regulator determine the steady state sense pressure. The additional sizing of bypass orifice 140 or 240, balance pressure chamber 136 or 236, the second stage pressure regulator and first spring 130 or 230 (if utilized) determine the natural frequency, damping ratio and lag compensator time constants, but do not change the steady state sense pressure.

It is contemplated that the size parameters of sense lines 104 and 204, bypass orifices 140 and 240, first valve spools 110 and 210, sense pistons 106 and 206, second valve spools 112 and 212, first springs 130 and 230, second springs 132 and 232, and first and second stage regulators can be selected in order to achieve a suitable regulator natural frequency and damping ratio. While shown and described in the exemplary context of coolant and/or lubricant oil for generators, those skilled in the art will readily appreciate that valves in accordance with this disclosure can be used in any other suitable application.

The methods and systems of the present disclosure, as described above and shown in the drawings, provide for pressure-regulating valves with superior properties including small or zero deviation of sense pressure from target value at steady state and tunable dynamic performance. The dynamic performance can be tuned with respect to natural frequency and damping ratio to provide stable operation that does not amplify hydraulic resonance of the cooling system. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A pressure-regulating valve comprising:
    a valve sleeve including a first end and a second end defining a longitudinal axis therebetween, and a bore axially aligned between the first and second ends;
    a sense line defined within the bore proximate the first end;
    a sense piston mounted within the bore between the sense line and the second end, configured to move along the longitudinal axis in response to pressure exerted by fluid in the sense line;
    a main chamber defined within the bore between the sense piston and the second end, wherein the main chamber includes an supply port and a vent port, wherein the supply port and the vent port are in fluid communication with one another by way of the main chamber;
    a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure, wherein the main chamber is defined between first and second land portions of the first valve spool;
    a bypass line defined between the main chamber and a balance pressure chamber for fluid communication therebetween; and
    a second valve spool mounted within the bore between the first valve spool and the second end configured to move along the longitudinal axis to modulate flow rate in the bypass line for regulation of a balance pressure, wherein the balance pressure chamber is defined between the first valve spool and the second valve spool, further comprising a first spring mounted between the first valve spool and a second housing portion proximate the second end of the valve sleeve, wherein the first spring is operatively connected to the first valve spool for biasing the first valve spool towards the first end of the valve sleeve.

2. A pressure-regulating valve as recited in claim 1, wherein the valve sleeve includes a first housing portion proximate the first end and a second housing portion proximate the second end, wherein the sense piston and first valve spool are mounted in the first housing portion and the second valve spool is mounted in the second housing portion, and wherein the second housing portion is secured to the first housing portion with a mechanical fastener.

3. A pressure-regulating valve as recited in claim 1, further comprising a second spring mounted within the bore between the second valve spool and the second end of the valve sleeve, wherein the second spring is operatively connected to the second valve spool for biasing the second valve spool towards the first end of the valve sleeve.

4. A pressure-regulating valve comprising:
    a valve sleeve including a first end and a second end defining a longitudinal axis therebetween, and a bore axially aligned between the first and second ends;
    a sense line defined within the bore proximate the first end;
    a sense piston mounted within the bore between the sense line and the second end, configured to move along the longitudinal axis in response to pressure exerted by fluid in the sense line;
    a main chamber defined within the bore between the sense piston and the second end, wherein the main chamber includes an supply port and a vent port, wherein the supply port and the vent port are in fluid communication with one another by way of the main chamber;
    a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure, wherein the main chamber is defined between first and second land portions of the first valve spool;
    a bypass line defined between the main chamber and a balance pressure chamber for fluid communication therebetween; and
    a second valve spool mounted within the bore between the first valve spool and the second end configured to move along the longitudinal axis to modulate flow rate in the bypass line for regulation of a balance pressure, wherein the balance pressure chamber is defined between the first valve spool and the second valve spool, wherein the bypass line is defined through the first valve spool.

5. A pressure-regulating valve comprising:
    a valve sleeve including a first end and a second end defining a longitudinal axis therebetween, and a bore axially aligned between the first and second ends;
    a sense line defined within the bore proximate the first end;

a sense piston mounted within the bore between the sense line and the second end, configured to move along the longitudinal axis in response to pressure exerted by fluid in the sense line;

a main chamber defined within the bore between the sense piston and the second end, wherein the main chamber includes an supply port and a vent port, wherein the supply port and the vent port are in fluid communication with one another by way of the main chamber;

a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure, wherein the main chamber is defined between first and second land portions of the first valve spool;

a bypass line defined between the main chamber and a balance pressure chamber for fluid communication therebetween; and a second valve spool mounted within the bore between the first valve spool and the second end configured to move along the longitudinal axis to modulate flow rate in the bypass line for regulation of a balance pressure, wherein the balance pressure chamber is defined between the first valve spool and the second valve spool, further comprising a bypass orifice within a portion of the bypass line in the second land portion proximate the balance pressure chamber, wherein the bypass orifice is configured to sustain a pressure differential between the sense line and balance pressure chamber and to meter flow through the bypass line.

6. A pressure-regulating valve comprising:
a valve sleeve including a first end and a second end defining a longitudinal axis therebetween, and a bore axially aligned between the first and second ends;
a sense line defined within the bore proximate the first end;
a sense piston mounted within the bore between the sense line and the second end, configured to move along the longitudinal axis in response to pressure exerted by fluid in the sense line;
a main chamber defined within the bore between the sense piston and the second end, wherein the main chamber includes an supply port and a vent port, wherein the supply port and the vent port are in fluid communication with one another by way of the main chamber;
a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure;
a second valve spool mounted within the bore between the first valve spool and the second end configured to move along the longitudinal axis to modulate flow rate in a bypass line for regulation of a balance pressure; and
a balance pressure chamber defined between the first valve spool and the second valve spool, wherein the balance pressure chamber forms a portion of a balance pressure circuit, wherein the balance pressure chamber is configured for continuous fluid flow between an inlet of the balance pressure chamber and an outlet of the balance pressure chamber for purging trapped air from the balance pressure circuit.

7. A pressure-regulating valve comprising:
a valve sleeve including a first end and a second end defining a longitudinal axis therebetween, and a bore axially aligned between the first and second ends;
a sense line defined within the bore proximate the first end;
a sense piston mounted within the bore between the sense line and the second end, configured to move along the longitudinal axis in response to pressure exerted by fluid in the sense line;
a main chamber defined within the bore between the sense piston and the second end, wherein the main chamber includes an supply port and a vent port, wherein the supply port and the vent port are in fluid communication with one another by way of the main chamber;
a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure;
a second valve spool mounted within the bore between the first valve spool and the second end configured to move along the longitudinal axis to modulate flow rate in a bypass line for regulation of a balance pressure; and
a balance pressure chamber defined between the first valve spool and the second valve spool, wherein the balance pressure chamber includes an inlet and an outlet, wherein the second valve spool occludes a portion of the outlet of the balance pressure chamber to a variable extent to regulate pressure within the balance pressure chamber.

8. A pressure-regulating valve comprising:
a valve sleeve including a first end and a second end defining a longitudinal axis therebetween, and a bore axially aligned between the first and second ends;
a sense line defined within the bore proximate the first end;
a sense piston mounted within the bore between the sense line and the second end, configured to move along the longitudinal axis in response to pressure exerted by fluid in the sense line;
a main chamber defined within the bore between the sense piston and the second end, wherein the main chamber includes an supply port and a vent port, wherein the supply port and the vent port are in fluid communication with one another by way of the main chamber;
a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure;
a second valve spool mounted within the bore between the first valve spool and the second end configured to move along the longitudinal axis to modulate flow rate in a bypass line for regulation of a balance pressure; and
a balance pressure chamber defined between the first valve spool and the second valve spool, further comprising a first spring mounted between the first valve spool and a second housing portion proximate the second end of the valve sleeve, wherein the first spring is operatively connected to the first valve spool for biasing the first valve spool towards the first end of the valve sleeve.

9. A pressure-regulating valve as recited in claim 8, further comprising a second spring mounted within the bore between the second valve spool and the second end of the valve sleeve, wherein the second spring is operatively connected to the second valve spool for biasing the second valve spool towards the first end of the valve sleeve.

10. A pressure-regulating valve comprising:
- a valve sleeve including a first end and a second end defining a longitudinal axis therebetween, and a bore axially aligned between the first and second ends;
- a sense line defined within the bore proximate the first end;
- a sense piston mounted within the bore between the sense line and the second end, configured to move along the longitudinal axis in response to pressure exerted by fluid in the sense line;
- a main chamber defined within the bore between the sense piston and the second end, wherein the main chamber includes an supply port and a vent port, wherein the supply port and the vent port are in fluid communication with one another by way of the main chamber;
- a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure;
- a second valve spool mounted within the bore between the first valve spool and the second end configured to move along the longitudinal axis to modulate flow rate in a bypass line for regulation of a balance pressure; and
- a balance pressure chamber defined between the first valve spool and the second valve spool, wherein the bypass line is defined through the first valve spool.

11. A pressure-regulating valve comprising:
- a valve sleeve including a first end and a second end defining a longitudinal axis therebetween, and a bore axially aligned between the first and second ends;
- a sense line defined within the bore proximate the first end;
- a sense piston mounted within the bore between the sense line and the second end, configured to move along the longitudinal axis in response to pressure exerted by fluid in the sense line;
- a main chamber defined within the bore between the sense piston and the second end, wherein the main chamber includes an supply port and a vent port, wherein the supply port and the vent port are in fluid communication with one another by way of the main chamber;
- a first valve spool mounted within the bore between the sense piston and the second end, wherein the first valve spool occludes a portion of the vent port to a variable extent to modulate a flow rate between the supply port and the vent port, and wherein the first valve spool is configured to move along the longitudinal axis to modulate a flow rate in a fluid circuit for regulation of a sense pressure, wherein the main chamber is defined between first and second land portions of the first valve spool;
- a bypass line defined between the main chamber and a balance pressure chamber for fluid communication therebetween; and
- a second valve spool mounted within the bore between the first valve spool and the second end configured to move along the longitudinal axis to modulate flow rate in the bypass line for regulation of a balance pressure, wherein the balance pressure chamber is defined between the first valve spool and the second valve spool, wherein the balance pressure chamber includes an inlet and an outlet, wherein the second valve spool occludes a portion of the outlet of the balance pressure chamber to a variable extent to regulate pressure within the balance pressure chamber.

* * * * *